(12) United States Patent
Bergström et al.

(10) Patent No.: US 11,463,892 B2
(45) Date of Patent: Oct. 4, 2022

(54) REDUNDANCY HANDLING IN A WIRELESS COMMUNICATION NETWORK

(71) Applicant: Telefonaktiebolaget LM Ericsson (publ), Stockholm (SE)

(72) Inventors: Mattias Bergström, Sollentuna (SE); Paul Schliwa-Bertling, Ljungsbro (SE)

(73) Assignee: Teleonaktiebolaget LM Ericsson (Publ), Stockholm (SE)

( * ) Notice: Subject to any disclaimer, the term of this patent is extended or adjusted under 35 U.S.C. 154(b) by 96 days.

(21) Appl. No.: 17/266,687

(22) PCT Filed: Aug. 7, 2019

(86) PCT No.: PCT/EP2019/071272
§ 371 (c)(1),
(2) Date: Feb. 8, 2021

(87) PCT Pub. No.: WO2020/030720
PCT Pub. Date: Feb. 13, 2020

(65) Prior Publication Data
US 2021/0306879 A1 Sep. 30, 2021

Related U.S. Application Data

(60) Provisional application No. 62/717,252, filed on Aug. 10, 2018.

(51) Int. Cl.
*H04W 24/00* (2009.01)
*H04W 24/04* (2009.01)
*H04W 76/15* (2018.01)
*H04L 1/22* (2006.01)
*H04W 28/02* (2009.01)

(52) U.S. Cl.
CPC ............... *H04W 24/04* (2013.01); *H04L 1/22* (2013.01); *H04W 28/0268* (2013.01); *H04W 76/15* (2018.02)

(58) Field of Classification Search
None
See application file for complete search history.

(56) References Cited

U.S. PATENT DOCUMENTS

2018/0098250 A1    4/2018    Vrzic et al.

OTHER PUBLICATIONS

International Search Report and Written Opinion of the International Searching Authority, PCT/EP2019/071272, dated Nov. 6, 2019, 15 pages.
Huawei et al., SA WG2 Meeting #128, S2-187473, "Update of solution#3 and solution#4," Vilnius, Lithuania, Jul. 2-6, 2018, 7 pages.

(Continued)

*Primary Examiner* — Abdelillah Elmejjarmi
(74) *Attorney, Agent, or Firm* — Christopher & Weisberg, P.A.

(57) ABSTRACT

A method in a radio access network, RAN, node of a wireless communications network, wherein the communications network provides a connection of a user equipment, UE, to a data or core network, includes determining that a redundancy connection is required or is beneficial for the UE; determining available redundancy options that can be established for the UE; and selecting a redundancy option out of the plurality of available redundancy options to be activated for the UE, A corresponding RAN Node and a corresponding computer program are also provided.

23 Claims, 12 Drawing Sheets

(56) References Cited

OTHER PUBLICATIONS

3GPP, 3$^{rd}$ Generation Partnership Project; Technical Specification Group Services and System Aspects; Study on enhancement of Ultra-Reliable Low-Latency Communication (URLLC) support in the 5G Core network (5GC) (Release 16), 3GPP TR 23.725 v2.0.0 (Dec. 2018), 75 pages.

3GPP, 3$^{rd}$ Generation Partnership Project; Technical Specification Group Radio Access Network; NG-RAN; NG Application Protocol (NGAP) (Release 15), 3GPP TS 38.413 v.15.0.0 (Jun. 2018), 264 pages.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | reject |
| RAN UE NGAP ID | M | | 9.3.3.2 | | YES | reject |
| RAN Paging Priority | O | | 9.3.3.15 | | YES | ignore |
| NAS-PDU | O | | 9.3.3.4 | | YES | reject |
| PDU Session Resource Setup Request List | | 1 | | | YES | reject |
| >PDU Session Resource Setup Request Item IEs | | 1..<maxnoofPDUSessions> | | | EACH | reject |
| >>PDU Session ID | M | | 9.3.1.50 | | - | |
| >>PDU Session NAS-PDU | O | | 9.3.3.4 | | - | |
| >>S-NSSAI | M | | 9.3.1.24 | | - | |
| >>PDU Session Resource Setup Request Transfer | M | | OCTET STRING | Containing the PDU Session Resource Setup Request Transfer IE specified in subclause 9.3.4.1. | | |
| Redundancy Level | | | | Containing the requested redundancy level | | |

*FIG. 3*

REDUNDANCY HANDLING IN A WIRELESS COMMUNICATION NETWORK

CROSS REFERENCE TO RELATED APPLICATIONS

This application is a 35 U.S.C. § 371 national stage application of PCT International Application No. PCT/EP2019/071272 filed on Aug. 7, 2019, which in turns claims domestic priority to U.S. Provisional Patent Application No. 62/717,252, filed on Aug. 10, 2018, the disclosures and content of which are incorporated by reference herein in their entirety.

TECHNICAL FIELD

The present disclosure generally relates to wireless communication systems, and specifically relates to handling redundancy connections within a wireless communication network

BACKGROUND

To improve a reliability of a connection in a 3GPP network, there exists solutions where packets of data traffic are duplicated and sent over two independent PDU sessions, as e.g. being described in 3GPP TR 23.725 v0.2.0. The data traffic associated with these PDU sessions can then be transmitted on more or less independent paths from one endpoint to another. For example, the data traffic associated with these PDU sessions may be sent over different User Plane Functions (UPFs) which may be served by different hardware, and the links from these UPFs to the Radio Access Network (RAN) may also be independent to some degree a served by different hardware and hence reliability would be improved as hardware failure on one of these links may not impact the other link and hence communication can be more robust.

The 3GPP is working on a New Radio (NR) standard for 5G, building on LTE/EUTRAN standards. According to NR, the RAN comprises a set of access nodes, also being referred to as gNBs. In some situations, it may be advantageous that different PDU sessions are carried over different gNBs so that if one gNB fails, there is another one which works, and the communication would not be interrupted. To achieve this, the core network may indicate to the RAN that Dual Connectivity (DC) shall be enabled for the UE so that the UE gets connected to two gNBs such that the different PDU sessions can be carried over these two gNBs to improve reliability.

FIG. 1 illustrates a method to establish redundancy sessions in a 3GPP radio network. This methid may apply to both IP and Ethernet PDU sessions. FIG. 1 thereto shows a User Equipment, UE 100, being connected to two different radio access nodes or base stations comprising a master NR network node (referred to herein as MgNB 200) and a secondary eNBs (referred to herein as SeNB 201). Further FIG. 1 shows an Access and Mobility Function (AMF) 400, a first Session Management Function (SMF1) 501, a second Session Management Function (SMF2) 502, a first User Plane Function (UPF1) 301, and a second User Plane Function (UPF2) 302, both UPF1 and UPF2 being associated to a data network, DN 300.

AMF 400 provides UE-based authentication, authorization, mobility management, etc. A UE even using multiple access technologies is associated to a single AMF because the AMF is independent of the access technologies.

SMF (SMF1 501 or SMF2 502) is responsible for session management and allocates IP addresses to UEs. It may also select and control the UPF for data transfer. If a UE has multiple sessions, e.g. PDU session 1 and PDU session 2 as shown in FIG. 1, different SMFs may be allocated to each session to manage them individually and possibly provide different functionalities per session. In the example of FIG. 1, SMF1 501 manages PDU session 1, and SMF2 502 manages PDU session 2.

The UPF selection may be based on existing mechanisms. Based e.g. on UE indication or network configuration, the SMF may initiate a corresponding UPF selection. When the PDU sessions are established, it may be indicated to the RAN to handle the two PDU Sessions at different gNBs, in the example of FIG. 1 MgNB 200 and SgNB 201, using dual connectivity. As shown in FIG. 1, initially (before dual connectivity setup), the two PDU Sessions 1 and 2 both use the MgNB 200. As soon as dual connectivity is set up in RAN, the second PDU Session starts using the SgNB 201, and the user plane tunneling is switched to go via the SgNB.

However, in some situations, dual connectivity may not be available, for example if the UE is not in the coverage of an gNB which could act as SgNB for the UE. Hence, a gNB receiving from the core network an indication to apply dual connectivity may result in failure to establish redundant PDU sessions. Further, this approach does not consider alternative approaches for establishing redundancy.

SUMMARY

It is an object of embodiments of the invention to provide a flexible handling (or managing) of redundancy establishment.

This object is achieved by the independent claims. Advantageous embodiments are described in the dependent claims.

Embodiments concern a method performed by a radio access network, RAN, node of a wireless communications network, wherein the communications network provides a connection of a UE to a data (or core) network, comprising:
- determining that a redundancy connection is required or is beneficial for the UE;
- determining available redundancy options that can be established for the UE; and
- selecting a redundancy option out of the plurality of available redundancy options to be activated for the UE.

Other embodiments concern radio network node comprising a processor causing the radio access node to carry out the steps of:
- determining that a redundancy connection is required or is beneficial for the UE;
- determining, available redundancy options that can be established for the UE; and
- selecting a redundancy option out of the plurality of available redundancy options to be activated for the UE.

Other embodiments concern a computer program comprising computer program code to be executed by a processor causing a radio network node to perform the steps of the above method, and a computer program storage medium.

In the following, detailed embodiments of the present invention shall be described in order to give the skilled person a full and complete understanding. It is to be noted that these embodiments are illustrative and not intended to be limiting.

BRIEF DESCRIPTION

FIG. 3 illustrates a list of information elements of a message received by a RAN node to establish redundancy.

Figure 8:
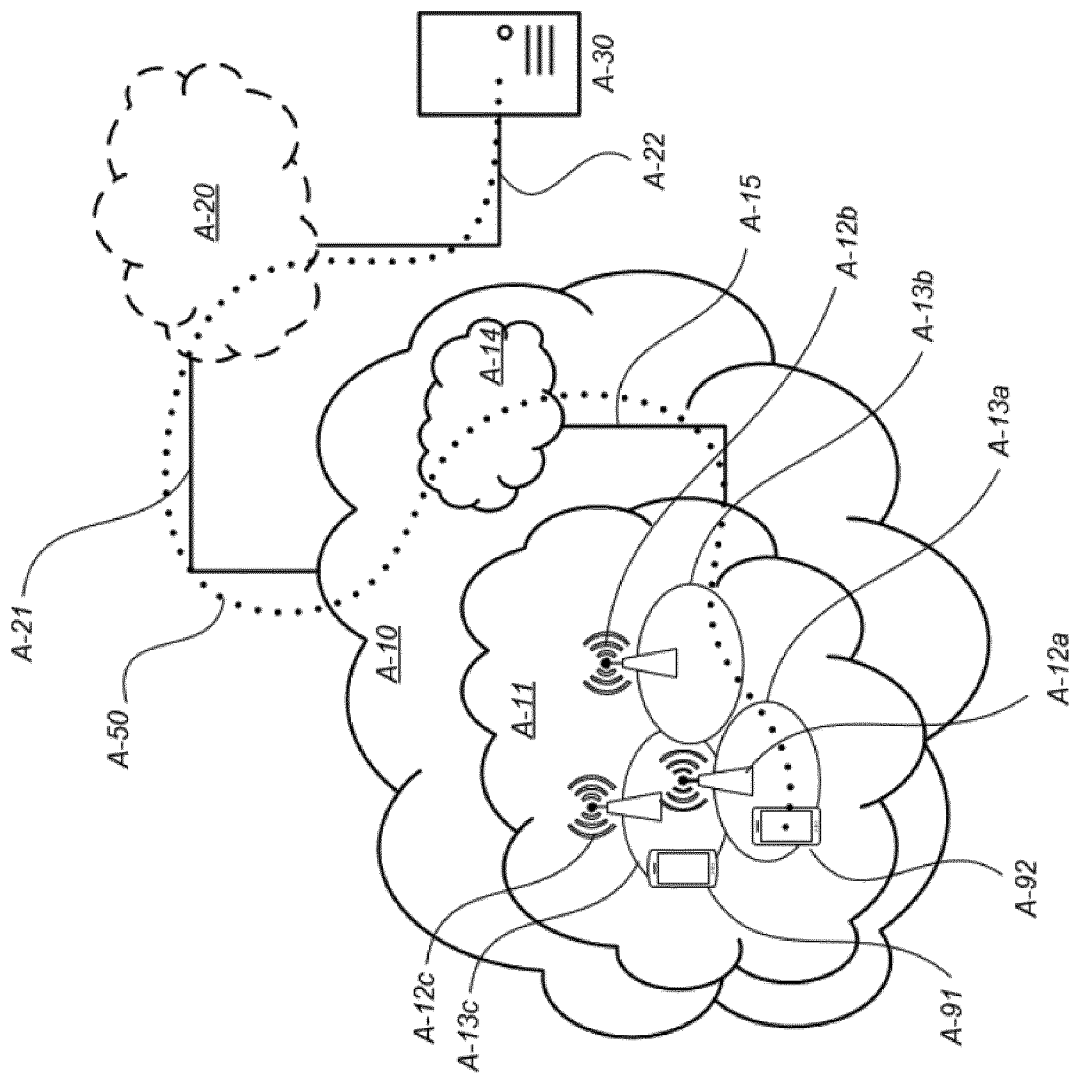

FIG. 8 schematically illustrates a telecommunication network connected via an intermediate network to a host computer.

Figure 9:
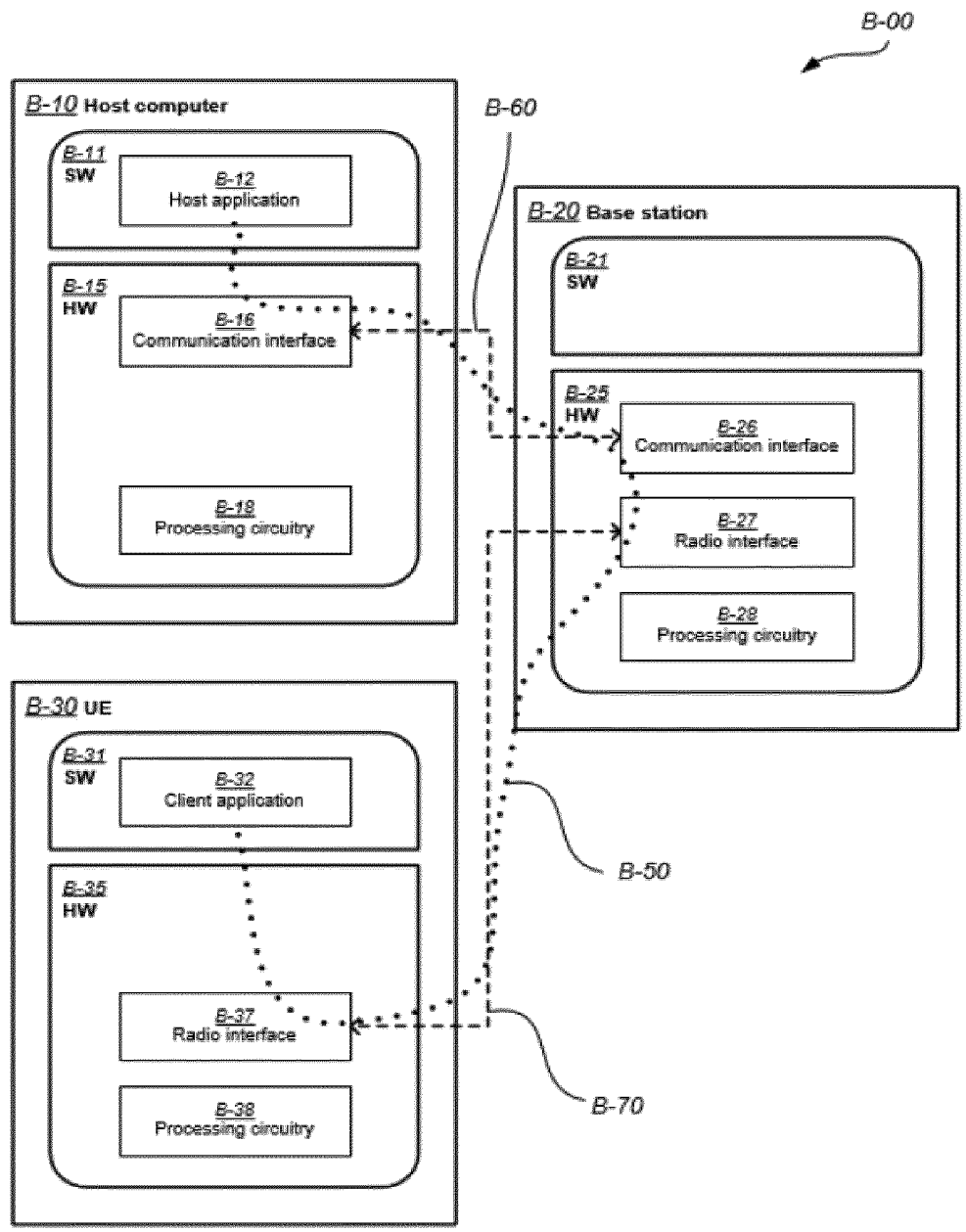

FIG. 9 is a generalized block diagram of a host computer communicating via a base station with a user equipment over a partially wireless connection.

FIGS. 10 to 13 are flowcharts illustrating methods implemented in a communication system including a host computer, a base station and a user equipment.

DETAILED DESCRIPTION

Some of the embodiments contemplated herein will now be described more fully hereinafter with reference to the accompanying drawings.

Figure 1:
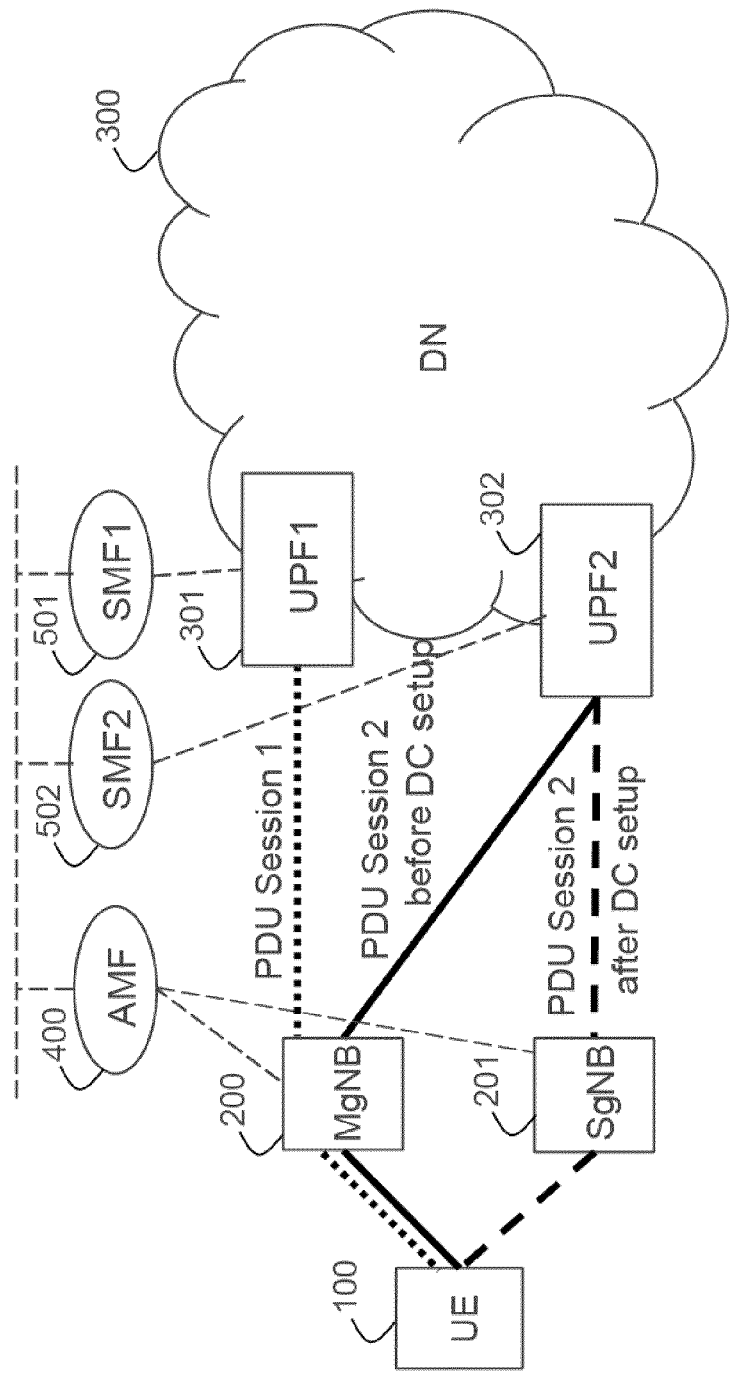
FIG. 1 illustrates a wireless network according to 3GPP performing dual connectivity.

In an embodiment, a radio access network, RAN, node, e.g. a (first) gNB or a MgNB 200 of FIG. 1, determines that redundancy is required or is beneficial for the UE 100. The RAN node then determines one redundancy option out of a plurality of redundancy options, and initiates enabling (performing) the redundancy option for the UE communication In an embodiment, determining the redundancy option out of the plurality of redundancy options comprise determining which redundancy options of the plurality of redundancy options are (currently) available for the UE 100 and selecting one option out of the available options.

In an embodiment, the RAN node selects one redundancy option out of the plurality of (available) redundancy options based on a priority of the (available) redundancy options.

The RAN node thereto may establish an order of priority for the different options (that may also be referred to as redundancy levels). The RAN node may then establish a redundancy option with the highest possible priority.

In an embodiment, at least two redundancy options are (currently) available, wherein option 1 has a higher priority than option 2. If both options are currently available (e.g. if the RAN node can establish both options), option 1 is chosen to be established. Otherwise, if option 1 is currently not available, option 2 is chosen to be established.

In an embodiment, each of the options is associated to one or a plurality of pre-requisitions or conditions. Such pre-requisitions/conditions may comprise a capability of the UE and/or a (required) Quality of Service, QoS. Such pre-requisitions/conditions may be preconfigured or may be determined by the network. By way of example, the RAN node may get an information about conditions and/or pre-requisitions from another network node.

Determining a currently availability may comprise determining if pre-requisitions/condition are met (e.g. if the radio quality for option 1 does currently not met the conditions for that option, the RAN node determines that this option is not available for the UE).

In an embodiment, there are plurality of approaches or options involving a plurality of RAN nodes and/or RAN functions. By way of example one redundancy option may involve different (physically separated) RAN nodes of different technologies (e.g. LTE/5G and WLAN). Yet another redundancy option may involve different RAN nodes each associated to different radio cells (e.g. MeNB 200 and SeNB 201 of FIG. 1). Yet another redundancy option may involve physically separated RAN nodes of the same technology. Yet another redundancy option may involve different RAN (sub-)nodes associated to the same radio cell (e.g. different DUs of a gNB). Yet another redundancy option may involve separate functions of the same physical RAN node (e.g. different CU-UP functions of a gNB CU). Therein the separate functions may be associated to one or a plurality of different layers, e.g. different functions associated to the protocol data unit (PDU) layer.

In one embodiment, a core network node, e.g. a SMF, sends an indication to the RAN node, e.g. the gNB that redundancy is required or beneficial for the UE (and/or for the (application layer) communication to be carried out with the UE). In response to the indication, the RAN node determines if and how redundancy may be enabled.

Exemplary redundancy approaches or options may be as follows:

A. enable Dual Connectivity for the UE (involving a second gNB or a SgNB);
B. enable Carrier Aggregation for the UE;
C. enable an additional use of an alternative RAT (e.g. WLAN) for the UE;
D. enable serving the UE by using two (or more) units of the RAN node, e.g. different distributed units, DUs, of a gNB as being discussed below; and
E. enable a use of separate RAN user plane resources, e.g. different user plane resources of a serving central unit, CU-UP, of a gNB as being discussed below.

Dependent on certain conditions such as a radio condition, UE capabilities, a UE subscription and/or QoS requirements for a data service provided to the UE, the RAN node may select one of the redundancy options. The RAN node may further select a redundancy option based on an information received from another node, e.g. from a core network node (SMF).

As discussed, the RAN node may establish an order of priority for the different options (that may also be referred to as redundancy levels), e.g. for the options A-E as shown above. Therein, option A may have the highest priority (level), whereas option E may have the lowest priority (level). The RAN may then try to establish/maintain a redundancy option with the highest possible priority.

The RAN node may for example prioritize to establish Dual Connectivity for a UE, if feasible. If this is not feasible (based on the certain conditions), the RAN node may prioritize to establish Carrier Aggregation for the UE. If this is not feasible, the RAN node may prioritize to establish a use of an alternative RAT (e.g. WLAN) for the UE. If this is not feasible, the RAN node may prioritize to start serving the UE using two (or more) different DUs. If this is still not feasible, the RAN node may establish a use of separate RAN user plane resources.

In an embodiment, the RAN node determines one of the options based on evaluating one or a plurality of the following conditions:

If a connection is available which the UE can get served by (and on which e.g. a redundant PDU session can be carried over);
if an available connection is good enough, e.g. in terms of signal quality/strength; and/or
if the UE has a capability to utilize the connection(s).

For example, for establishing the redundancy option with Dual Connectivity, the (5G) gNB may determine, if there is a cell available in another gNB, or for establishing the redundancy option of Carrier Aggregation, if there is a cell available in the same gNB, etc. The gNB may determine those availabilities based on certain UE measurements. Thereto, the gNB may send a request to the UE to perform certain measurements and receive the certain UE measurements from the UE.

In an embodiment for limited UE capabilities, a UE may only have a capability to be served on certain (predefined) frequency bands (or combination of bands) of a plurality of (contiguous) bands only. As an example, if a UE is only capable to communicate or to be served on bands A+B or on bands A+C, and the UE is currently served on band B by a primary gNB (MgNB) while a candidate secondary gNB (SgNB) serves only band C, it is not feasible to establish Dual Connectivity between these gNBs and the UE, since the UE does not support the combination of band B+C. A possibility to establish Carrier Aggregation and/or a use of an alternative RAT may likewise depend on capabilities of the UE.

In an embodiment, the core network, CN, sends an information to the RAN node, wherein the information comprises an indication of one or a plurality of redundancy options (out of one or a plurality of predetermined options) that are allowed.

In an embodiment, such information may be part of a (modified) NGAP PDU Session Resource Setup Request, e.g. within the frame of a NGAP PDU Session Resource Setup Request as defined in 3GPP TS 38.413 v15.0.0.

Another example to convey the requested redundancy level is to add such information to the NGAP Initial Context Setup Request message of the same 3GPP specification.

As discussed above, an option for redundancy may be realized by establishing a plurality of PDU sessions. Thereto, in an embodiment, a PDU Session Resource Setup Request is sent from the AMF of the core network (CN) to the (NG) RAN node. Responsive to this request, the RAN node may assign resources on Uu and NG-U for one or several PDU sessions.

The core network may additionally indicate an action that the RAN node shall take if the requested redundancy level can't be provided, e.g. to establish another option in case that PDU Session resources are removed (and to indicate a release of the resources to the CN and/or to other nodes).

Due to varying radio conditions, an availability of redundancy options may change. Such variations may be due to movements of the UE. Thus, at some point in time a certain option for achieving redundancy that was feasible up to that point in time may become unfeasible (or vice versa at some point in time a certain option for achieving redundancy that was un feasible up to that point in time may become feasible).

For example, if up to a certain point in time Dual Connectivity has been used and the radio condition to the SgNB becomes poor so that connection may no longer be good enough to be able to serve traffic (or at least to a meaningful degree since packets may be lost too often, etc.), then Dual Connectivity would no longer work. Or similarly in case of Carrier Aggregation the secondary cells on which one of the PDU session are carried no longer can be maintained.

In case that an actually used redundancy option gets inutile (e.g. a condition is changing such that it falls below a defined threshold), the RAN node may switch to another redundancy option. Therein, the RAN node may select the option associated to the next lower redundancy level of the available option.

For example, if Dual Connectivity was applied first, and the UE 100 moves out of the coverage of the SeNB 201, the gNB may secondly establish Carrier Aggregation for achieving (maintaining) redundancy.

When evaluating (an) alternative option(s), the RAN may consider the priority order as described above and/or may consider the allowed redundancy approaches, as discussed above.

In an embodiment, different redundancy options may have the same level. Before switching between option of different levels (e.g. switching from option 1 to option 2 after the current option 1 get inutile), the RAN node may establish a redundancy option of the same level. E.g. in case the gNB (of a 5G network) has applied the Dual Connectivity approach for achieving redundancy and the UE moves away, another gNB may become the most suitable to be act as the SgNB 201 for the UE 100 and hence Dual Connectivity may be maintained using another gNB as SgNB 201.

If there is no suitable (feasible) redundancy option left, e.g. if the UE moves out of the coverage of a SgNB while there is no alternative SgNB which can be used, and/or there is no other suitable redundancy approach which can be used, the RAN node (gNB) is not able to maintain (or establish) redundancy with respect to the UE. In such scenario, the RAN node may send a corresponding information to the core network. The core network may, upon receiving such an information, notify an application function, AF (e.g. through a PCF). The AF may determine, if the remaining reliability of the "non-redundant" communication is sufficient for an application involving the UE. The AF may e.g. disable functionality that requires a degree of reliability that is currently not available, e.g. by a removal of the PDU session(s).

As discussed above, the term gNB is being used within the frame of 5G standardization. The gNB may be realized as a group of radio network nodes deployed in a disaggregated manner.

Figure 2:
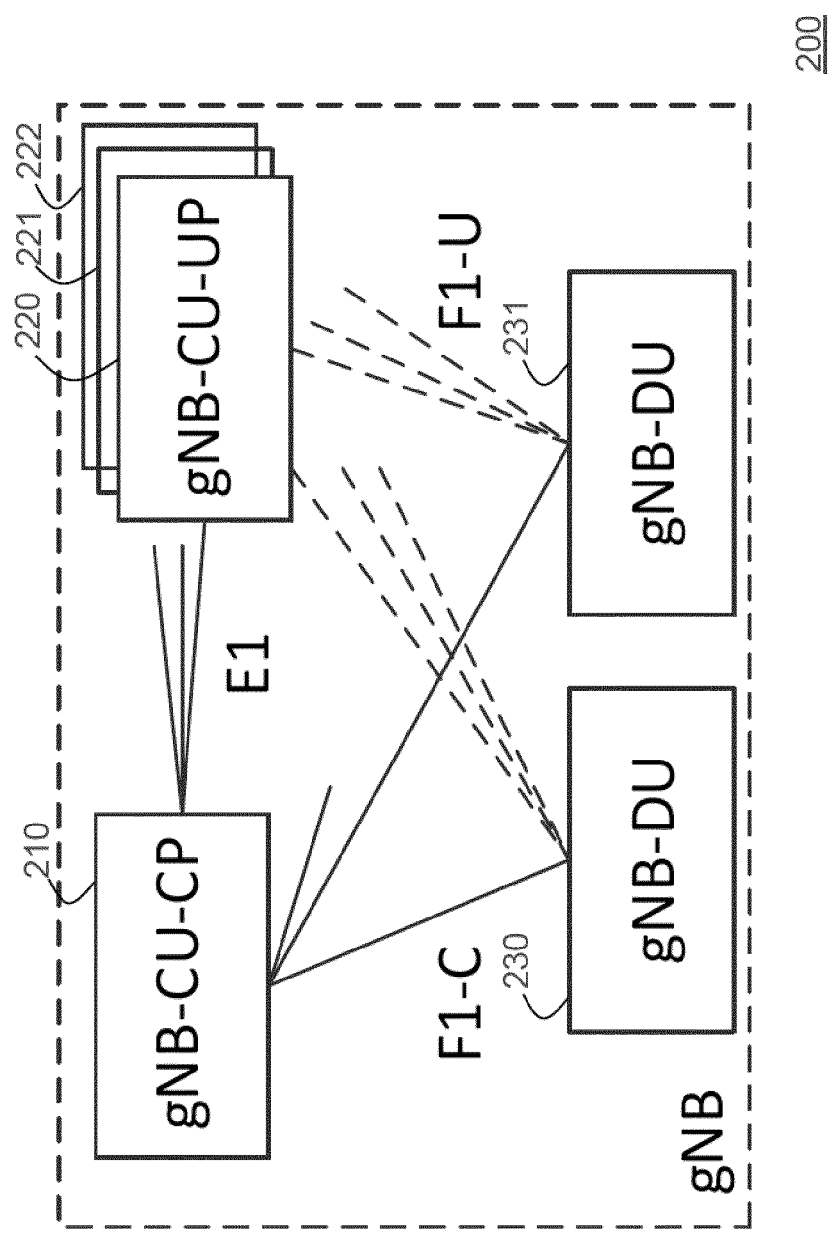
FIG. 2 illustrates an embodiment wherein one or a plurality of RAN nodes of the network is/are split into a central unit, CU and distributed unit DU.

FIG. 2 thereto illustrates a disaggregated gNB or radio access network node deployment according to 3GPP TS 38.401v15.0.2, e.g. MgNB 200 of FIG. 1. Therein the gNB functions are distributed into a so-called central unit, CU, and one or a plurality of so-called distributed units, DU (gNB-DUs). A functional distribution by way of example may be chosen such that the radio resource control, RRC, layer and packet data convergence protocol, PDCP, layer reside in the CU, while the radio link control, RLC layer, the media access control, MAC, layer and the physical, PHY, layer of the radio interface reside in the one or the plurality of DUs.

The CU may be further split into a control plane unit, CU-CP (gNB-CU-CP 210), and one or a plurality of user plane units, CU-UPs (gNB-CU-UP 220, 221, 222). There may be one or a plurality of DUs e.g. gNB-DU 230 and gNB-DU 231, wherein each of these DUs may be associated to one or a plurality of cells.

The gNB-CU-CP 210 is connected to gNB-DUs 230 and 231 through the logical F1-C interface; the gNB-CU-UPs 220, 221, 222 are connected to the gNB-DUs through the logical F1-U interface; and the gNB-CU-UP 210 is connected to any of the gNB-CU-CP 220, 221, 222 through the logical E1 interface.

In an embodiment, an option for redundancy (as being discussed above as option D) may be realized by enabling a use of DUs 230, 231 of the gNB 200.

In an embodiment, an option for redundancy (as being discussed above as option E) may be realized by enabling a use of separate RAN user plane resources, e.g. different user plane resources (or units) of a serving central unit, CU-UP of a gNB.

Although the above-described embodiments are being described mainly in view of 3GPP 5G specifications, it shall be noted that the invention may be implemented similarly in any other wireless radio network of similar functions and/or structure. For example, options D and E may be as well implemented in disaggregated LTE base stations.

As discussed above, the (core) network may indicate to the RAN redundancy information. The redundancy information may be indicative of redundancy options/approaches that are allowed (e.g. whether Dual Connectivity is allowed or not, whether Carrier Aggregation is allowed or not, and/or whether enabling the use of another RAT for the UE is allowed for achieving redundancy), or of a requested redundancy level to be established with respect to the UE.

Such indication may be sent in a NGAP PDU Session Resource Setup Request as specified in section 9.2.1.1 of 3GPP TS 38.413v15.0.0. This message may be sent by the AMF, and it is used to request the (NG) RAN node to assign resources on Uu and NG-U for one or several PDU session resources.

FIG. 3 illustrates an exemplarily enhanced PDU session resource setup request message. This message comprises the information elements as specifed in section 9.2.1.1 of 3GPP TS 38.413v15.0.0. and an additional information element referred to as redundancy level.

Figure 4:
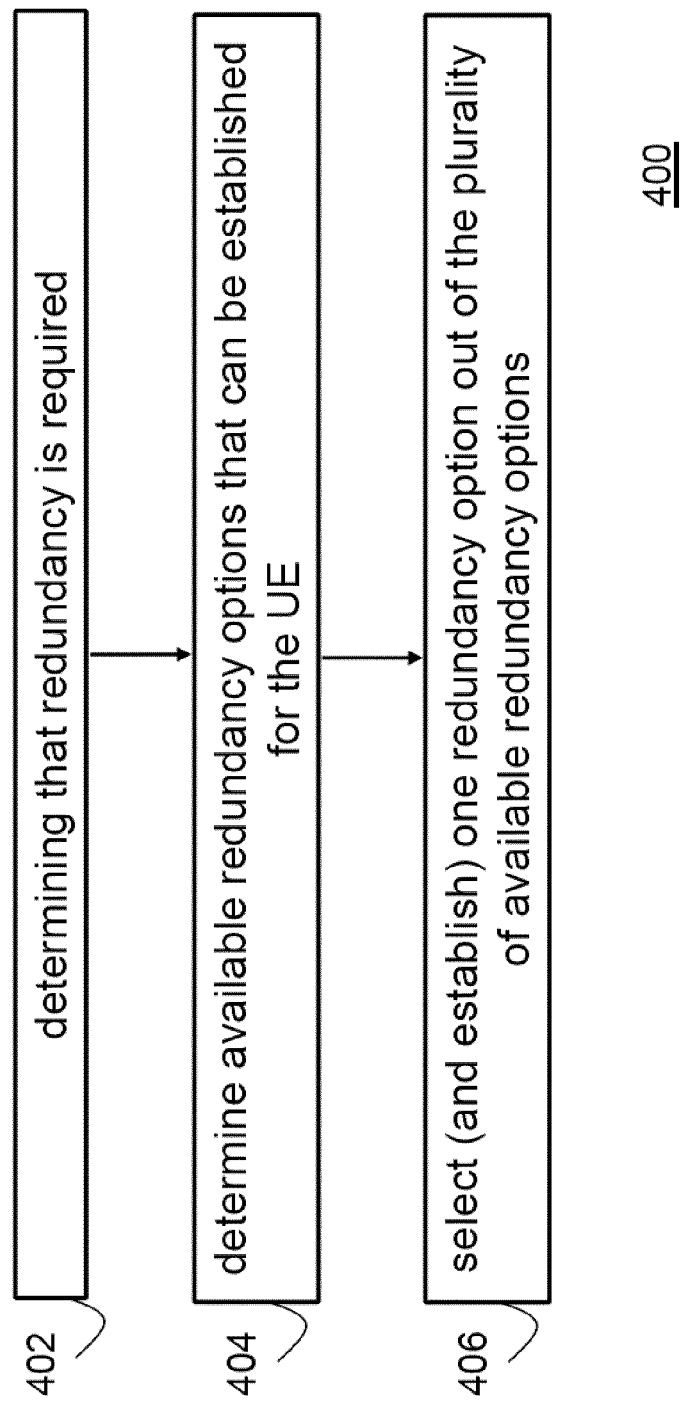
FIG. 4 is a flow chart of an exemplary method performed in a RAN node to establish redundancy.

FIG. 4 illustrates a flow diagram of an exemplary method 400 performed by a radio network node In a first step 402, the RAN node may determine that redundancy is required or is beneficial for the UE.

In a second step 404, the RAN node may determine available redundancy options that can be established for the UE.

In a third step 406, the RAN node may select (and establish) one redundancy option out of the plurality of available redundancy options.

In an embodiment, determining that redundancy is required comprises receiving an information from another wireless network node as described above.

In an embodiment, determining available redundancy options may comprise establishing an order of priority for the different options (that may also be referred to as redundancy levels).

In an embodiment, selecting (and establishing) one redundancy option may comprise selecting (and establishing) a redundancy option of the different options which has the highest possible priority of the different available options.

Figure 5:
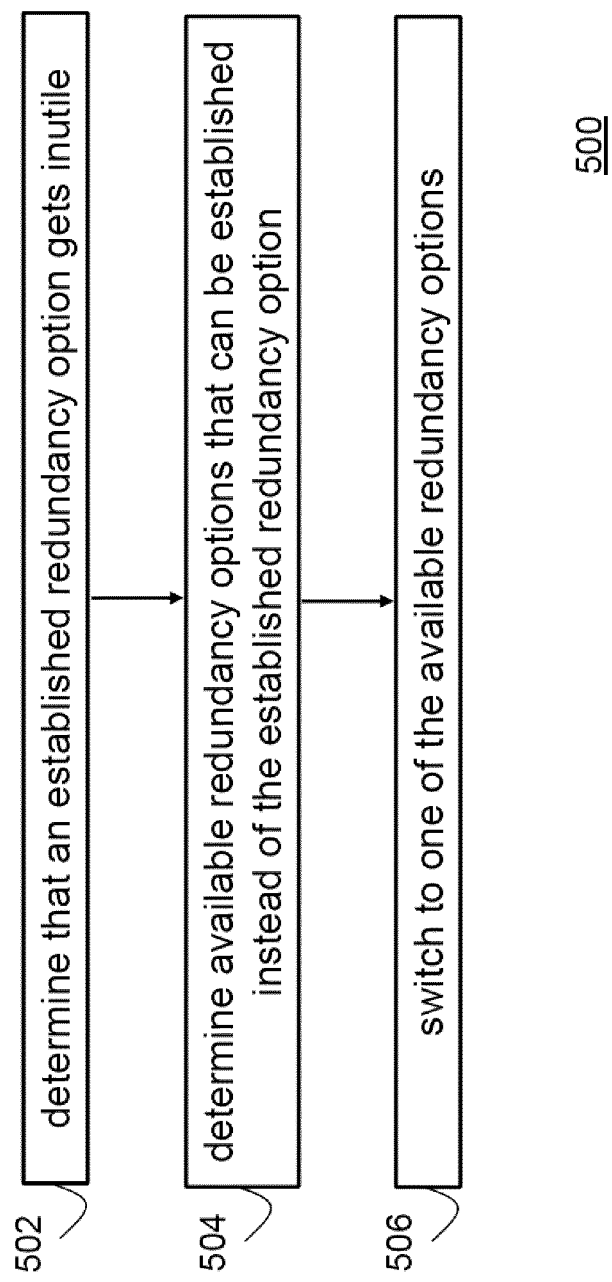
FIG. 5 is flow chart of another method performed in a RAN node to maintain redundancy.

FIG. 5 illustrates a flow diagram of a further exemplary method 500 performed by a radio network node In a first step 502, the RAN node may determine that an established redundancy option gets inutile.

In a second step 504, the RAN node may determine available redundancy options that can be established to replace the currently established redundancy option.

In a third step 506, the RAN node may switch (de-establish the current redundancy option and establishing the new redundancy option) to one redundancy option out of the plurality of available redundancy options.

Figure 6:
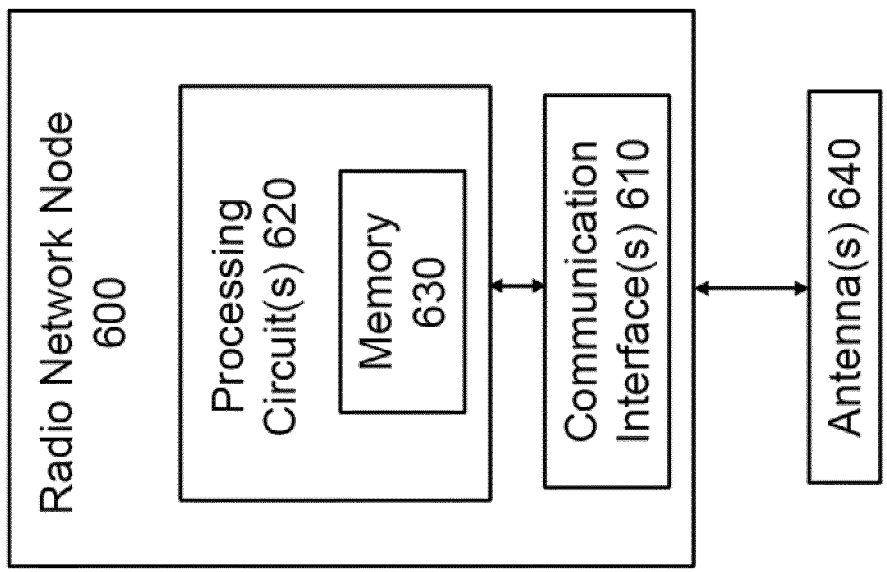
FIG. 6 is a block diagram illustrating exemplary physical blocks of a gNB.

FIG. 6 illustrates an example radio network node 600 according to one or more embodiments. The radio network node is configured to implement embodiments to enable and/or maintain redundancy as described above.

The radio network node may comprise one or more processing circuits 620 configured to implement processing such as by implementing functional means or units for performing one or more aspects described above. In one embodiment, for example, the processing circuit(s) 620 implements functional means or units as respective circuits. The circuits in this regard may comprise circuits dedicated to performing certain functional processing and/or one or more microprocessors in conjunction with memory 630. In embodiments that employ memory 630, which may comprise one or several types of memory such as read-only memory (ROM), random-access memory, cache memory, flash memory devices, optical storage devices, etc., the memory 630 stores program code that, when executed by the one or more for carrying out one or more microprocessors, carries out the techniques described herein.

In embodiments, the radio network node also comprises one or more communication interfaces 610. The one or more communication interfaces 610 include various components (e.g., antennas 640) for sending and receiving data and control signals.

More particularly, the interface(s) 610 include a transmitter that is configured to use known signal processing techniques, typically according to one or more standards, and is configured to condition a signal for transmission (e.g., over the air via one or more antennas 640). Similarly, the interface(s) include a receiver that is configured to convert signals received (e.g., via the antenna(s) 640) into digital samples for processing by the one or more processing circuits. The transmitter and/or receiver may also include one or more antennas 640. By utilizing the communication interface(s) 610 and/or antenna(s) 640, the radio network node is able to communicate with other devices to transmit QoS data flows as well as manage the mapping of these flows to radio bearers, remap the flows to different bearers, and/or remove the flows entirely.

Figure 7:
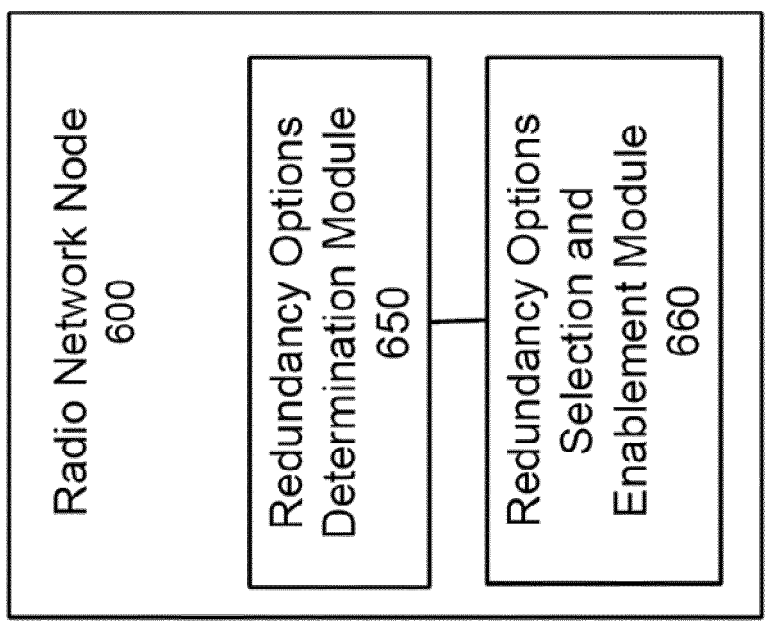
FIG. 7 is a block diagram illustrating exemplary functional blocks of a gNB.

FIG. 7 illustrates a functional block diagram of the exemplary network node 600. The functional blocks may comprise a redundancy options determination module 650 and a redundancy options selection and enablement module 660.

The redundancy options determination module 650 may be configured to perform first step 402 and second step 504 of FIG. 4 and/or first step 502 and second step 504 of FIG. 5.

The redundancy options selection and enablement module 660 may be configured to perform third step 406 of FIG. 4 and/or third step 506 of FIG. 5.

Those skilled in the art will also appreciate that embodiments herein further include corresponding computer programs. A computer program comprises instructions which, when executed on at least one processor of a network node, cause the device or devices to carry out any of the respective processing described above. Furthermore, the processing or functionality may be considered as being performed by a single instance or device or may be divided across a plurality of instances that may be present in a given wireless system such that together the device instances perform all disclosed functionality.

Embodiments further include a carrier containing such a computer program. This carrier may comprise one of an electronic signal, optical signal, radio signal, or computer readable storage medium. A computer program in this regard may comprise one or more code modules corresponding to the means or units described above.

An access network node or RAN node herein can be any type node that is capable of communicating with another node over radio signals, e.g. a gNB according to 3GPP 5G specifications, an eNB according to 3GPP 4G specifications, or a NodeB according to other 3GPP specifications. Such node may also be generally referred to as access point or base station.

A UE is any type device capable of communicating with a radio network node over radio signals, such as, but not limited to, a device capable of performing autonomous wireless communication with one or more other devices, including a machine-to-machine (M2M) device, a machine-type communications (MTC) device, a user equipment (UE) (it should be noted that the UE does not necessarily have a "user" in the sense of an individual person owning and/or operating the device).

A UE may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, and wireless customer-premises equipment (CPE). In the discussion herein, a UE may encompass also equipment configured to transmit and/or receive data without human interaction such as machine-to-machine (M2M) devices, machine-type communication (MTC) devices, and (wireless) sensors.

In the present description, current 3GPP terminology is being preferably used. It is to be noted that 3GPP may change terminology without departing from the current principles.

It is to be noted that although the embodiments described herein focus on the NR radio interface, the same principles may be applicable also to LTE nodes showing a similar (functional and/or structural) structure.

FIG. 8 schematically illustrates a telecommunication network connected via an intermediate network to a host computer. With reference to FIG. 8, in accordance with an embodiment, a communication system includes a telecommunication network A-10, such as a 3GPP-type cellular network, which comprises an access network A-11, such as a radio access network, and a core network A-14. The access network A-11 comprises a plurality of base stations A-12a, A-12b, A-12c, such as NBs, eNBs, gNBs or other types of wireless access points, each defining a corresponding coverage area A-13a, A-13b, A-13c. In an aspect, any of base stations A-12a, A-12b, A-12c, or any other base stations described herein may be considered to be a network node, for instance, if such as network node is described above in the present Application. Each base station A-12a, A-12b, A-12c is connectable to the core network A-14 over a wired or wireless connection A-15. A first user equipment (UE) A-91 located in coverage area A-13c is configured to wirelessly connect to, or be paged by, the corresponding base station A-12c. A second UE A-92 in coverage area A-13a is wirelessly connectable to the corresponding base station A-12a. While a plurality of UEs A-91, A-92 are illustrated in this example, the disclosed embodiments are equally applicable to a situation where a sole UE is in the coverage area or where a sole UE is connecting to the corresponding base station A-12. In an aspect, any of these UEs, or any other UE described herein may be considered to be configured to perform the aspects of any UE, user terminal, client device, or mobile device described above in the present Application.

The telecommunication network A-10 is itself connected to a host computer A-30, which may be embodied in the hardware and/or software of a standalone server, a cloud-implemented server, a distributed server or as processing resources in a server farm. The host computer A-30 may be under the ownership or control of a service provider, may be operated by the service provider or on behalf of the service provider. The connections A-21, A-22 between the telecommunication network A-10 and the host computer A-30 may extend directly from the core network A-14 to the host computer A-30 or may go via an optional intermediate network A-20. The intermediate network A-20 may be one of, or a combination of more than one of, a public, private or hosted network; the intermediate network A-20, if any, may be a backbone network or the Internet; in particular, the intermediate network A-20 may comprise two or more sub-networks (not shown).

The communication system of FIG. 8 as a whole enables connectivity between one of the connected UEs A-91, A-92 and the host computer A-30. The connectivity may be described as an over-the-top (OTT) connection A-50. The host computer A-30 and the connected UEs A-91, A-92 are configured to communicate data and/or signaling via the OTT connection A-50, using the access network A-11, the core network A-14, any intermediate network A-20 and possible further infrastructure (not shown) as intermediaries. The OTT connection A-50 may be transparent in the sense that the participating communication devices through which the OTT connection A-50 passes are unaware of routing of uplink and downlink communications. For example, a base station A-12 may not or need not be informed about the past routing of an incoming downlink communication with data originating from a host computer A-30 to be forwarded (e.g., handed over) to a connected UE A-91. Similarly, the base station A-12 need not be aware of the future routing of an outgoing uplink communication originating from the UE A-91 towards the host computer A-30.

Example implementations, in accordance with an embodiment, of the UE, base station and host computer discussed in the preceding paragraphs will now be described with reference to FIG. 9. FIG. 9 is a generalized block Diagram of a host computer communicating via a base station with a user equipment over a partially wireless connection.

With reference to FIG. 9, in a communication system B-00, a host computer B-10 comprises hardware B-15 including a communication interface B-16 configured to set up and maintain a wired or wireless connection with an interface of a different communication device of the communication system B-00. The host computer B-10 further comprises processing circuitry B-18, which may have storage and/or processing capabilities. In particular, the processing circuitry B-18 may comprise one or more programmable processors, application-specific integrated circuits, field programmable gate arrays or combinations of these (not shown) adapted to execute instructions. The host computer B-10 further comprises software B-11, which is stored in or accessible by the host computer B-10 and executable by the processing circuitry B-18. The software B-11 includes a host application B-12. The host application B-12 may be operable to provide a service to a remote user, such as a UE B-30 connecting via an OTT connection B-50 terminating at the UE B-30 and the host computer B-10. In providing the service to the remote user, the host application B-12 may provide user data which is transmitted using the OTT connection B-50.

The communication system B-00 further includes a base station B-20 provided in a telecommunication system and comprising hardware B-25 enabling it to communicate with the host computer B-10 and with the UE B-30. The hardware B-25 may include a communication interface B-26 for setting up and maintaining a wired or wireless connection with an interface of a different communication device of the communication system B-00, as well as a radio interface B-27 for setting up and maintaining at least a wireless connection B-70 with a UE B-30 located in a coverage area (not shown in FIG. 9) served by the base station B-20.

The communication interface B-26 may be configured to facilitate a connection B-60 to the host computer B-10. The connection B-60 may be direct or it may pass through a core network (not shown in FIG. 9) of the telecommunication system and/or through one or more intermediate networks outside the telecommunication system. In the embodiment shown, the hardware B-25 of the base station B-20 further includes processing circuitry B-28, which may comprise one or more programmable processors, application-specific integrated circuits, field programmable gate arrays or combinations of these (not shown) adapted to execute instructions. The base station B-20 further has software B-21 stored internally or accessible via an external connection.

The communication system B-00 further includes the UE B-30, which has already been referred to above. Its hardware B-35 may include a radio interface B-37 configured to set up and maintain a wireless connection B-70 with a base station serving a coverage area in which the UE B-30 is currently located. The hardware B-35 of the UE B-30 further includes processing circuitry B-38, which may comprise one or more programmable processors, application-specific integrated circuits, field programmable gate arrays or combinations of these (not shown) adapted to execute instructions. The UE B-30 further comprises software B-31, which is stored in or accessible by the UE B-30 and executable by the processing circuitry B-38.

The software B-31 includes a client application B-32. The client application B-32 may be operable to provide a service to a human or non-human user via the UE B-30, with the support of the host computer B-10. In the host computer B-10, an executing host application B-12 may communicate with the executing client application B-32 via the OTT connection B-50 terminating at the UE B-30 and the host computer B-10. In providing the service to the user, the client application B-32 may receive request data from the host application B-12 and provide user data in response to the request data. The OTT connection B-50 may transfer both the request data and the user data. The client application B-32 may interact with the user to generate the user data that it provides.

It is noted that the host computer B-10, base station B-20 and UE B-30 illustrated in FIG. 9 may be identical to the host computer A-30, one of the base stations A-12a, A-12b, A-12c and one of the UEs A-91, A-92 of FIG. 8, respectively. This is to say, the inner workings of these entities may be as shown in FIG. 9 and independently, the surrounding network topology may be that of FIG. 8.

In FIG. 9, the OTT connection B-50 has been drawn abstractly to illustrate the communication between the host computer B-10 and the use equipment B-30 via the base station B-20, without explicit reference to any intermediary devices and the precise routing of messages via these devices. Network infrastructure may determine the routing, which it may be configured to hide from the UE B-30 or from the service provider operating the host computer B-10, or both. While the OTT connection B-50 is active, the network infrastructure may further take decisions by which it dynamically changes the routing (e.g., on the basis of load balancing consideration or reconfiguration of the network).

The wireless connection B-70 between the UE B-30 and the base station B-20 is in accordance with the teachings of the embodiments described throughout this disclosure. One or more of the various embodiments improve the performance of OTT services provided to the UE B-30 using the OTT connection B-50, in which the wireless connection B-70 forms the last segment. More precisely, the teachings of these embodiments can improve one or more of data rate, latency, and/or power consumption associated with one or more devices and/or communications of/performed in communication system B-00, and thereby can provide benefits for OTT user data communication, such as one or more of reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring the OTT connection B-50 between the host computer B-10 and UE B-30, in response to variations in the measurement results. The measurement procedure and/or the network functionality for reconfiguring the OTT connection B-50 may be implemented in the software B-11 of the host computer B-10 or in the software B-31 of the UE B-30, or both.

In embodiments, sensors (not shown) may be deployed in or in association with communication devices through which the OTT connection B-50 passes; the sensors may participate in the measurement procedure by supplying values of the monitored quantities exemplified above, or supplying values of other physical quantities from which software B-11, B-31 may compute or estimate the monitored quantities. The reconfiguring of the OTT connection B-50 may include message format, retransmission settings, preferred routing etc.; the reconfiguring need not affect the base station B-20, and it may be unknown or imperceptible to the base station B-20.

Such procedures and functionalities may be known and practiced in the art. In certain embodiments, measurements may involve proprietary UE signaling facilitating the host computer's B-10 measurements of throughput, propagation times, latency and the like. The measurements may be implemented in that the software B-11, B-31 causes messages to be transmitted, in particular empty or 'dummy' messages, using the OTT connection B-50 while it monitors propagation times, errors etc.

FIGS. 10, 11, 12, and 13 are flowcharts illustrating methods implemented in a communication system including a host computer, a base station and a user equipment.

Figure 10:
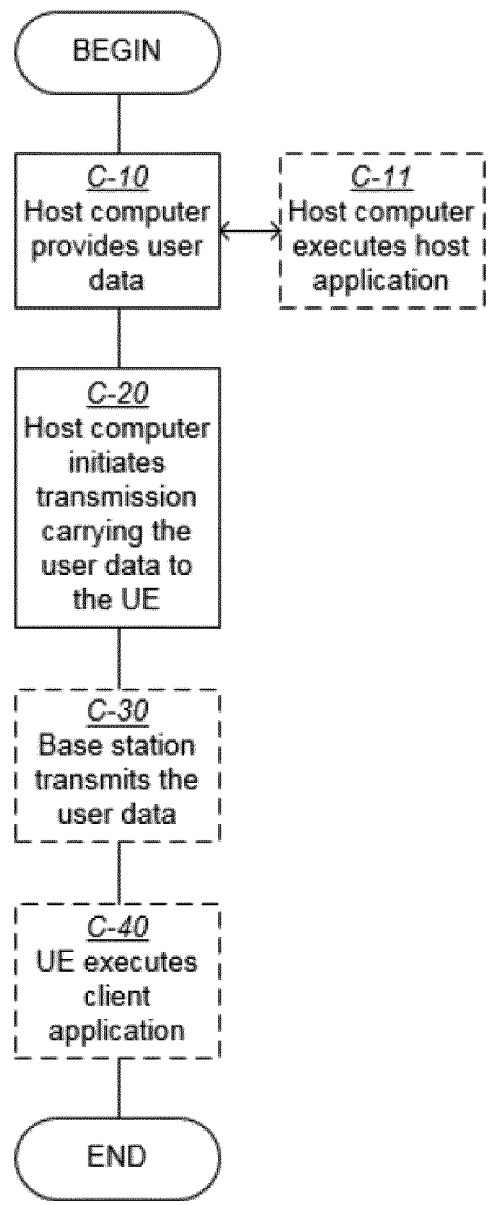

FIG. 10 is a flowchart illustrating a method implemented in a communication system, in accordance with one embodiment.

The communication system includes a host computer, a base station and a UE which may be those described with reference to FIGS. 8 and 9. For simplicity of the present disclosure, only drawing references to FIG. 10 will be included in this section. In a first step C-10 of the method, the host computer provides user data.

In an optional substep C-11 of the first step C-10, the host computer provides the user data by executing a host application. In a second step C-20, the host computer initiates a transmission carrying the user data to the UE.

In an optional third step C-30, the base station transmits to the UE the user data which was carried in the transmission that the host computer initiated, in accordance with the teachings of the embodiments described throughout this disclosure. In an optional fourth step C-40, the UE executes a client application associated with the host application executed by the host computer.

Figure 11:
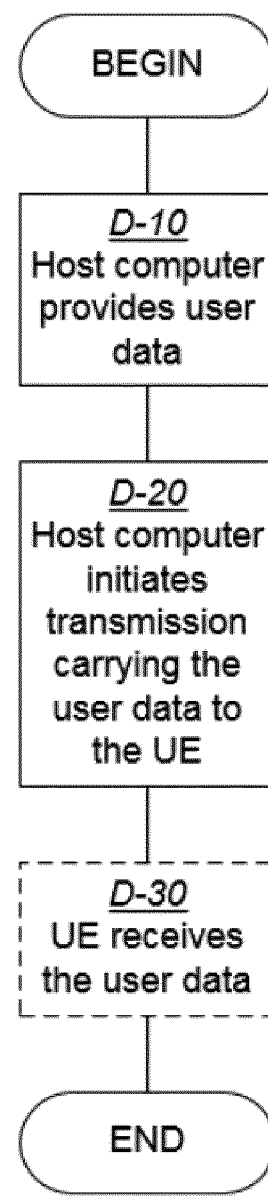

FIG. 11 is a flowchart illustrating a method implemented in a communication system, in accordance with one embodiment.

The communication system includes a host computer, a base station and a UE which may be those described with reference to FIGS. 8 and 9. For simplicity of the present disclosure, only drawing references to FIG. 11 will be included in this section. In a first step D-10 of the method, the host computer provides user data.

In an optional substep (not shown) the host computer provides the user data by executing a host application. In a second step D-20, the host computer initiates a transmission carrying the user data to the UE. The transmission may pass via the base station, in accordance with the teachings of the embodiments described throughout this disclosure. In an optional third step D-30, the UE receives the user data carried in the transmission.

Figure 12:
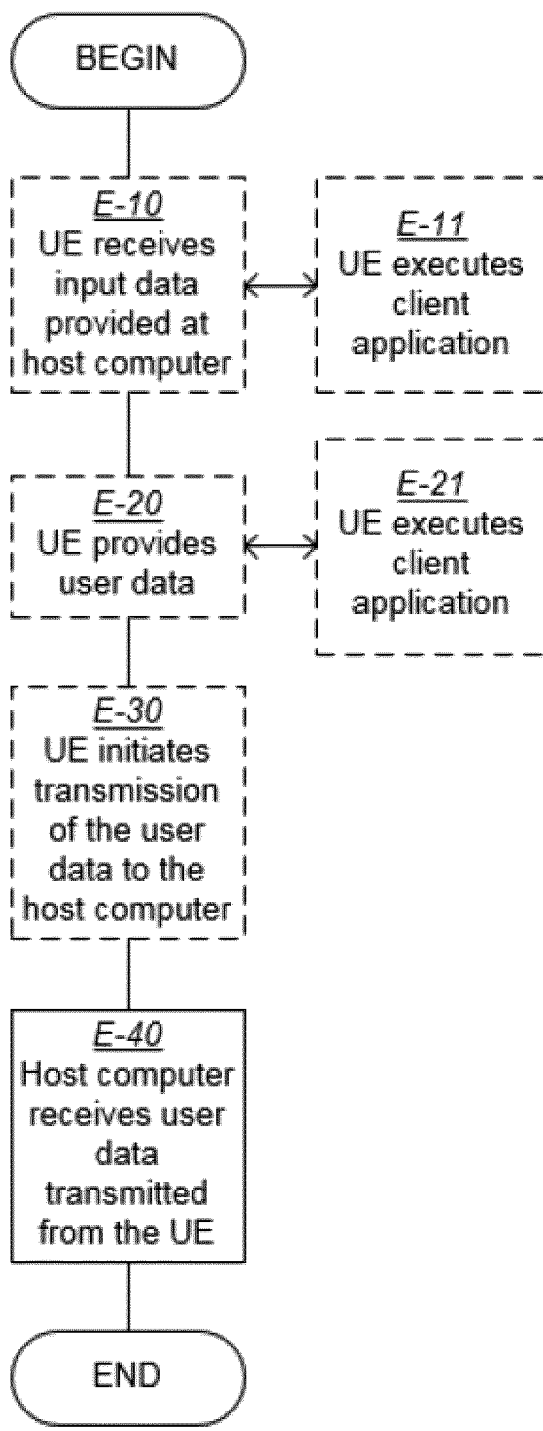

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In an optional first step E-10 of the method, the UE receives input data provided by the host computer. Additionally or alternatively, in an optional second step E-20, the UE provides user data. In an optional substep E-21 of the second step E-20, the UE provides the user data by executing a client application. In a further optional substep E-11 of the first step E-10, the UE executes a client application which provides the user data in reaction to the received input data provided by the host computer. In providing the user data, the executed client application may further consider user input received from the user. Regardless of the specific manner in which the user data was provided, the UE initiates, in an optional third substep E-30, transmission of the user data to the host computer. In a fourth step E-40 of the method, the host computer receives the user data transmitted from the UE, in accordance with the teachings of the embodiments described throughout this disclosure.

Figure 13:
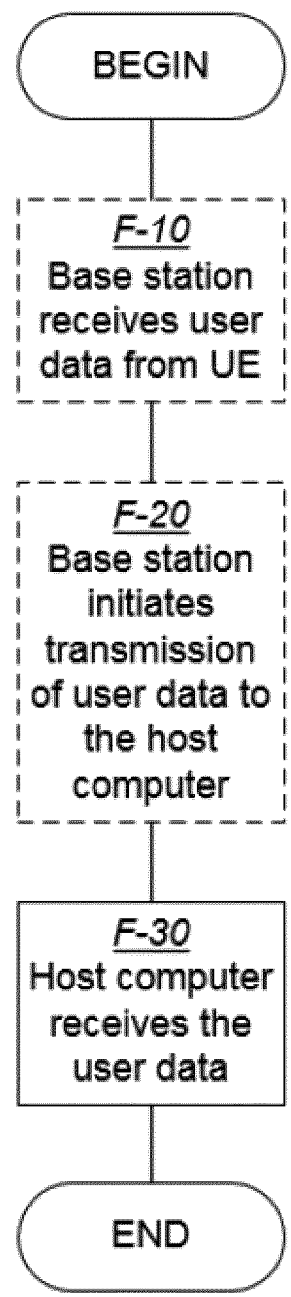

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In an optional first step F-10 of the method, in accordance with the teachings of the embodiments described throughout this disclosure, the base station receives user data from the UE. In an optional second step F-20, the base station initiates transmission of the received user data to the host computer. In a third step F-30, the host computer receives the user data carried in the transmission initiated by the base station.

Further exemplary embodiments are listed in the following:

A-1. A base station configured to communicate with a user equipment (UE), the base station comprising a radio interface and processing circuitry configured to perform aspects of example embodiments described throughout the present disclosure.

A-2. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform aspects of example embodiments described throughout the present disclosure, including aspects related to forwarding the user data to the UE.

A-3. The communication system of embodiment A-2, further including the base station.

A-4. The communication system of embodiment A-3, further including the UE, wherein the UE is configured to communicate with the base station.

A-5. The communication system of embodiment A-4, wherein:
the processing circuitry of the host computer is configured to execute a host application, thereby providing the user data; and
the UE comprises processing circuitry configured to execute a client application associated with the host application.

A-6. A method implemented in a base station, comprising aspects of example embodiments described throughout the present disclosure, including aspects related to transmitting user data to a UE.

A-7. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station is configured to perform aspects of example embodiments described throughout the present disclosure, included aspects related to transmitting the user data to the UE.

A-8. The method of embodiment A-7, further comprising:
at the base station, transmitting the user data.

A-9. The method of embodiment A-8, wherein the user data is provided at the host computer by executing a host application, the method further comprising:
at the UE, executing a client application associated with the host application.

A-10. A user equipment (UE) configured to communicate with a base station, the UE comprising a radio interface and processing circuitry configured to perform aspects of example embodiments described throughout the present disclosure, including aspects related to receiving user data from the base station.

A-11. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's processing circuitry configured to perform aspects of example embodiments described throughout the present disclosure, including aspects related to the UE receiving the user data from the base station.

A-12. The communication system of embodiment A-11, further including the UE.

A-13. The communication system of embodiment A-12, wherein the cellular network further includes a base station configured to communicate with the UE.

A-14. The communication system of embodiment A-12 or A-13, wherein:
the processing circuitry of the host computer is configured to execute a host application, thereby providing the user data; and
the UE's processing circuitry is configured to execute a client application associated with the host application.

A-15. A method implemented in a user equipment (UE), comprising aspects of example embodiments described throughout the present disclosure, including aspects related to the UE receiving user data from a base station.

A-16. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE is configured to perform aspects of example embodiments described throughout the present disclosure, including aspects related to the UE receiving the user data from the base station.

A-17. The method of embodiment A-16, further comprising:
at the UE, receiving the user data from the base station.

A-18. A user equipment (UE) configured to communicate with a base station, the UE comprising a radio interface and processing circuitry configured to perform aspects of example embodiments described throughout the present disclosure, including aspects related to the UE transmitting user data to the base station.

A-19. A communication system including a host computer comprising:
a communication interface configured to receive user data originating from a transmission from a user equipment (UE) to a base station,
wherein the UE comprises a radio interface and processing circuitry, the UE's processing circuitry configured to perform aspects of example embodiments described throughout the present disclosure, including aspects related to the UE transmitting user data to the base station.

A-20. The communication system of embodiment A-19, further including the UE.

A-21. The communication system of embodiment A-20, further including the base station, wherein the base station comprises a radio interface configured to communicate with the UE and a communication interface configured to forward to the host computer the user data carried by a transmission from the UE to the base station.

A-22. The communication system of embodiment A-20 or A-21, wherein:
the processing circuitry of the host computer is configured to execute a host application; and
the UE's processing circuitry is configured to execute a client application associated with the host application, thereby providing the user data.

A-23. The communication system of embodiment A-20 or A-21, wherein:
the processing circuitry of the host computer is configured to execute a host application, thereby providing request data; and
the UE's processing circuitry is configured to execute a client application associated with the host application, thereby providing the user data in response to the request data.

A-24. A method implemented in a user equipment (UE), comprising aspects of example embodiments described throughout the present disclosure, including aspects related to the UE transmitting user data to a base station.

A-25. The method of embodiment A-24, further comprising:
providing user data; and
forwarding the user data to a host computer via the transmission to the base station.

A-26. A method implemented in a communication system including a host computer, a base station and a user equipment (UE), the method comprising:
at the host computer, receiving user data transmitted to the base station from the UE, wherein the UE is configured to perform aspects of example embodiments described throughout the present disclosure, including aspects related to the UE transmitting user data to the base station.

A-27. The method of embodiment A-26, further comprising:
at the UE, providing the user data to the base station.

A-28. The method of embodiment A-27, further comprising:
at the UE, executing a client application, thereby providing the user data to be transmitted; and
at the host computer, executing a host application associated with the client application.

A-29. The method of embodiment A-27, further comprising:
at the UE, executing a client application; and
at the UE, receiving input data to the client application, the input data being provided at the host computer by executing a host application associated with the client application,
wherein the user data to be transmitted is provided by the client application in response to the input data.

A-30. A base station configured to communicate with a user equipment (UE), the base station comprising a radio interface and processing circuitry configured to perform aspects of example embodiments described throughout the present disclosure, including aspects related to the base station receiving user data from the UE.

A-31. A communication system including a host computer comprising a communication interface configured to receive user data originating from a transmission from a user equipment (UE) to a base station, wherein the base station comprises a radio interface and processing circuitry, the base station's processing circuitry configured to perform aspects of example embodiments described throughout the present disclosure, including aspects related to the base station receiving user data from the UE.

A-32. The communication system of embodiment A-31, further including the base station.

A-33. The communication system of embodiment A-32, further including the UE, wherein the UE is configured to communicate with the base station.

A-34. The communication system of embodiment A-33, wherein:
the processing circuitry of the host computer is configured to execute a host application;
the UE is configured to execute a client application associated with the host application, thereby providing the user data to be received by the host computer.

A-35. A method implemented in a base station, comprising perform aspects of example embodiments described throughout the present disclosure, including aspects related to the base station receiving user data from a user equipment (UE).

A-36. A method implemented in a communication system including a host computer, a base station and a user equipment (UE), the method comprising:

at the host computer, receiving, from the base station, user data originating from a transmission which the base station has received from the UE, wherein one or both of the base station and the UE are configured to perform aspects of example embodiments described throughout the present disclosure, including aspects related to the base station receiving user data from the UE and/or aspects related to the UE transmitting user data to the base station.

A-37. The method of embodiment A-36, further comprising:

at the base station, receiving the user data from the UE.

A-38. The method of embodiment A-37, further comprising:

at the base station, initiating a transmission of the received user data to the host computer.

The invention claimed is:

1. A method performed by a radio access network, RAN, node of a wireless communications network, wherein the communications network provides a connection of a user equipment, UE to a data or core network, comprising:

determining that a redundancy connection is required or is beneficial for the UE;

determining available options for redundancy connections in the form of redundancy options that can be established for the UE; and selecting a redundancy option out of the plurality of available redundancy options to be activated for the UE;

each redundancy option being associated to one or a plurality of conditions, and determining an available redundancy option comprises determining if the corresponding one or the plurality of conditions are fulfilled, the conditions comprising a level or a threshold of a radio condition to be met; and selecting the redundancy option out of the plurality of available redundancy options comprises selecting the redundancy option that corresponds to a higher level than the requested level of redundancy.

2. The method of claim 1, wherein determining that redundancy is required or beneficial comprises receiving a redundancy information from another wireless network node, e.g. from a session management function, SMF, responsible for session management and allocation of IP addresses to UEs.

3. The method of claim 1, wherein the redundancy information is indicative of allowed or possible redundancy options to be established or maintained with respect to the UE.

4. The method of claim 1, wherein determining available redundancy options may comprise establishing an order of priority for the different options.

5. The method of claim 4, wherein the order of priority comprises an order of redundancy levels wherein each of the options is associated to one of the redundancy levels.

6. The method of claim 1, wherein the redundancy information is indicative of a level of redundancy that is requested to be established or maintained with respect to the UE.

7. The method of claim 1, wherein the radio condition is characterized by at least one of: a signal power, a signal quality, a signal-to-noise ratio, and a signal-to-interference-plus-noise ratio, SINR.

8. The method of claim 1, wherein the conditions further comprise at least one of: a capability of the UE to communicate according to the redundancy option; and a Quality of Service, QoS level to be met.

9. The method of claim 1, wherein the redundancy options comprise one or a plurality of: Dual Connectivity involving different RAN nodes; a plurality of RAN nodes of different technologies, e.g. one of a 4G or a 5G RAN node, and one of a wireless local area network access network, WLAN, node; a plurality of different units or functions of the same RAN node, e.g. different distributed units, DUs, of the RAN node; and a plurality of different RAN user plane resources, e.g. different user plane resources of a central unit, CU-UP, of the RAN node.

10. The method of claim 9, wherein the different DUs of the RAN node are associated to different cells.

11. The method of claim 1, comprising monitoring whether a redundancy option being currently activated for the UE is still functional and performing switching to another redundancy option in case that the currently activated redundancy option is determined as not being functional.

12. The method of claim 11, wherein the monitoring whether a redundancy option being currently activated for the UE is still functional comprises monitoring if the conditions are currently met.

13. A radio network node comprising a processor causing the radio network node to carry out the steps of:

determining that a redundancy connection is required or is beneficial for the UE;

determining available options for redundancy connections in the form of redundancy options that can be established for the UE; and selecting a redundancy option out of the plurality of available redundancy options to be activated for the UE;

each redundancy option being associated to one or a plurality of conditions, and determining an available redundancy option comprises determining if the corresponding one or the plurality of conditions are fulfilled, the conditions comprising a level or a threshold of a radio condition to be met; and selecting the redundancy option out of the plurality of available redundancy options comprises selecting the redundancy option that corresponds to a higher level than the requested level of redundancy.

14. The network node of claim 13, being configured to receiving a redundancy information from another wireless network node, e.g. core network node, e.g. a SMF.

15. The network node of claim 13, wherein the redundancy information is indicative of allowed or possible redundancy options to be established or maintained with respect to the UE.

16. The network node of claim 13, being configured to determining to establishing an order of priority for the different options.

17. The network node of claim 13, wherein the order of priority comprises an order of redundancy levels wherein each of the options is associated to one of the redundancy levels.

18. The network node of claim 13, wherein the redundancy information is indicative of a level of redundancy that is requested to be established or maintained with respect to the UE.

19. The network node of claim 13, wherein the radio condition is characterized by at least one of: a signal power, a signal quality, a signal-to-noise ratio, and a signal-to-interference-plus-noise ratio, SINR.

20. The network node of claim 13, wherein the conditions comprise at least one of: a capability of the UE to communicate according to the redundancy option; and a Quality of Service, QoS level to be met.

21. The network node of claim 13, wherein the redundancy options comprise or involve one or a plurality of: Dual Connectivity involving different RAN nodes; Carrier Aggregation; A plurality of RAN nodes of different technologies, e.g. one of a 4G or a 5G RAN node, and one of a wireless local area network access network, WLAN, node; A plurality of different units or functions of the same RAN node, e.g. different distributed units, DUs, of the RAN node; and A plurality of different RAN user plane resources, e.g. different user plane resources of a central unit, CU-UP, of the RAN node.

22. The network node of claim 13, being configured to monitor if a redundancy option being currently activated for the UE is still functional and to performing switching to another redundancy option in case that the currently activated redundancy option is determined as not being functional.

23. A non-transitory storage medium comprising computer program code, the computer program code when executed by a processor causing an apparatus to perform the steps of the method of claim 1.

* * * * *